L. BELL.
PROJECTION AND DISTRIBUTION OF LIGHT.
APPLICATION FILED OCT. 3, 1919.
1,428,936.
Patented Sept. 12, 1922.
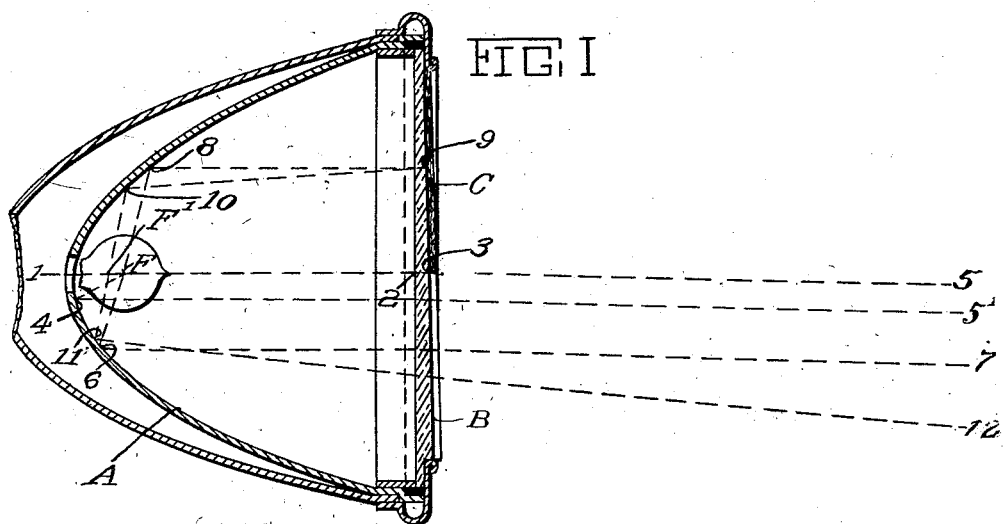
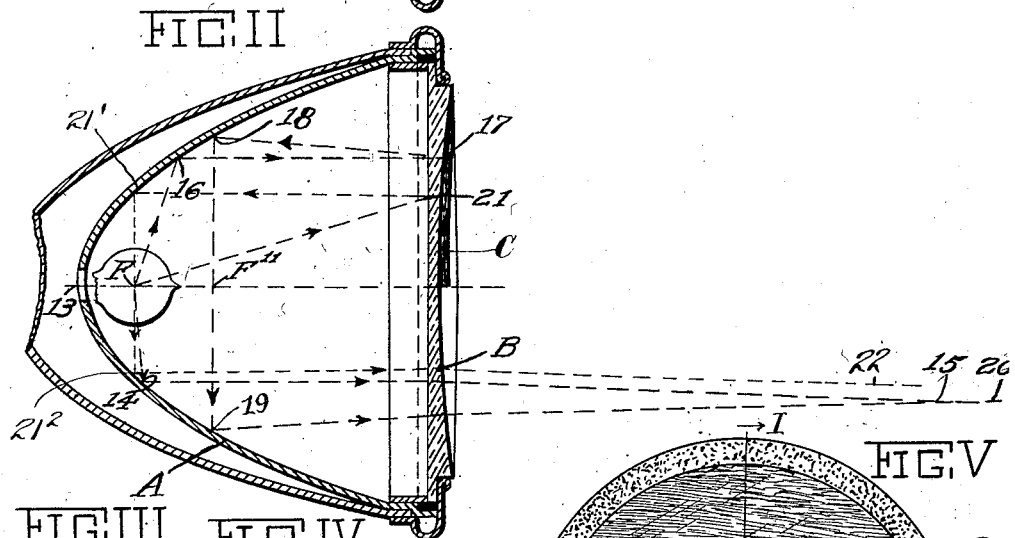
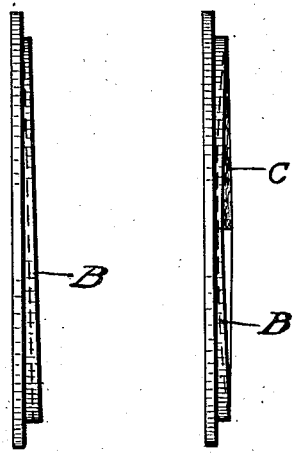
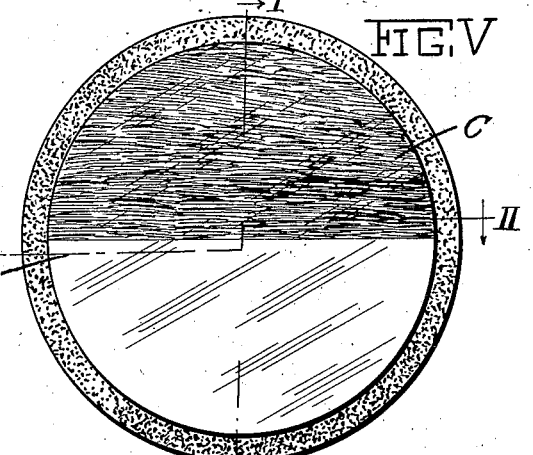
Inventor
Louis Bell
By Ellis Spear Jr.
Attorney Patented Sept. 12, 1922.

1,428,936

UNITED STATES PATENT OFFICE.

LOUIS BELL, OF WEST NEWTON, MASSACHUSETTS, ASSIGNOR TO EDWARD N. GODING, TRUSTEE, OF NEWTON, MASSACHUSETTS.

PROJECTION AND DISTRIBUTION OF LIGHT.

Application filed October 3, 1919. Serial No. 328,146.

*To all whom it may concern:*

Be it known that I, LOUIS BELL, a citizen of the United States, residing at West Newton, county of Middlesex, Commonwealth of Massachusetts, have invented certain new and useful Improvements in Projection and Distribution of Light, of which the following is a specification.

This invention relates to the projection and distribution of light, and especially to that selective distribution in a predetermined manner such as is so desirable and important in problems of illumination.

While my invention is capable of adaptation and use under a great variety of circumstances I shall for the purpose of illustrative disclosure in the present application discuss it more particularly in terms of road illumination for moving vehicles. I have therefore shown in the accompanying drawings a projector in the form of a headlight of the automobile type. The difficulties of this class of illumination are too well known and too well understood to require discussion, it only being necessary to point out that the natural requirements of night driving are the maintenance of low top beam of broad road intercept and of sufficient illumination close to the front of the car, which also obviates the difficulties and problems connected with other arrangements such as the illumination of signs, building fronts and the like Throughout the specification ai drawings I have employed like reference characters to indicate corresponding parts, and in the drawings:

Figs. I and II are sections on the lines 1—1 and 2—2, respectively, Fig. V, of a device in accordance with my invention. Fig. III is a side edge view of the lens, Fig. IV is a top edge view thereof, and Fig. V is a face view thereof.

In these drawings I have indicated at A a parabolic reflector fitted with a front or lens B which in the form shown is prismatic having its rear face preferably in the vertical plane and its forward face of increasing thickness downwardly from the top. The focus of the reflector A is indicated at F, and in this focus is to be located a suitable source of light such as an incandescent lamp.

Referring to these diagrammatic lines intended to indicate characteristic direction of the projected rays of the beam it will be seen that the direct rays in the axis 1—2 are refracted downwardly as at 3 towards a point 5 below the central horizontal axis of the reflector. Rays reflected to substantial parallelism in the lower part of the reflector are similarly refracted by the prism front or lens B in parallelism with the ray line 3—5, and its point 7. By such rays therefore as F—4—$5^1$ and F—6—7 there is afforded a sl'ghtly depressed driving light.

Referring now to the upper part of the reflector A it will be seen that such a ray as F—8 incident to the reflector would penetrate the front or lens B reaching a point on its front surface 9. The upper part of the front or lens B is formed with an inwardly disposed reflecting surface. In practice this is conveniently accomplished by silvering or gilding the exterior of the lens B. Such a coating may be fired on, and exteriorly protected by enamel or lacquer. This forms a mirror C inclined to the vertical so that a beam 8—9 incident to such a mirror being reflected therefrom in addition to its secondary refraction, .could be directed to a point 10 from which it would be again reflected to a point 11, thence by a third reflection or by a fourth reflection projected through the lower unsilvered portion of the prism front or lens B. Being again refracted by this lower portion it is still further depressed and directed downwards towards a point such as 12. Such a beam performs as if coming from a focus $F^1$ where it cuts the axis 1—2, and hence diverging downwardly and depressed gives a foreground light; that is to say, the illumination of the adjacent space ahead of the car.

From the foregoing the vertical selection and distribution of the light will be readily apparent and it will be seen that the projected beam will have substantially a flat top rather sharply cut off and yet of substantially full power, although distributed longitudinally of the road.

The transverse projection and distribution of the light may be seen in Fig. II. As appears in this figure the lens B while constituting a vertical prism is also of slight vertical cylindricity. This vertical cylindricity is shown as a preferred and practical form, although it might be modified in any arbitrarily dispersing form.

The direct rays just below the reflector C are refracted outwardly in varying amounts according to their distance from the axis 13—F. The direct rays from the light source falling upon the reflective surface C as indicated at 21 are reflected inwardly against the reflector A, as indicated at 21', thence downwardly against said reflector, as indicated at $21^2$ and thence outwardly through the plain portion of the lens B as indicated at 22, Fig. II.

The rays parallelized by reflection from the surface of the parabolic reflector A are similarly refracted outwardly as F—14—15 and simultaneously downwardly by virtue of the vertical prism of B.

The rays just above the edge of the reflector C as F—16—17 are by virtue of the curved surface of the reflector C reflected laterally as at 17—18 and transversely as at 19. Such a ray would pass through the lower face of the lens B below the reflector C being also refracted in the direction of the point 20. Such rays are therefore scattered both downwardly and laterally to an extent depending on their convergence, as they proceed from that virtual focus $F^{11}$ which is the point where such rays as 18 and 19 cut the axis 13—F prolonged, and also upon their refractive divergence due to the vertical concavity of the front or lens B.

In effect a long reaching beam is produced by the rays of similar function to that indicated at F—6—7. The foreground of light is amply furnished by the direct rays such as F—21—22 and a well distributed light in the near and middle distance results from those rays turned back by the mirror C in the upper face of the reflector as illustrated by F—8—9—10—11—12 of Fig. I, and F—16—17—18—19—20, Fig. II.

The front face of B may be of true concave cylindricity, vertically prismatic with respect to the rear face, or may form part of a paraboloid or other conic as in my prior Letters Patent No. 1,208,456.

No horizontal rear prisms are required in my present form of construction, since light above the axis is reflected backward by the mirror C and the deviation of the rays by the plural reflecting is effected in sufficient degree by even a small prismatic angle.

The virtual foci and $F^{11}$ are naturally somewhat blurred laterally by the curvature of the reflecting surface of the mirror C and the emergent light is thereby well distributed.

I prefer for simplicity of manufacture to make the whole reflective and refractive system of continuous prism and curve. Likewise the curvature laterally of the mirror C may be modified from that of the lower portion of the lens to vary locally the lateral distributions of the emergent reflected rays.

All these and various other modifications may obviously be resorted to without departing from the spirit of my invention if within the limits of the appended claims.

What I therefore claim and desire to secure by Letters Patent is:

1. In a light projector, a substantially parabolic reflector having a source of light in its focus, a transparent lens for the front of said reflector having curvature about a vertical axis and an inwardly faced reflecting surface on the outside of said lens in the upper face thereof for distributive dispersion of the reflected rays.

2. In a light projecting apparatus, a substantially parabolic reflector having a source of light in its focus, a transparent lens for the front of said reflector having a vertical prism, and an inwardly faced reflecting surface formed on the outside of said lens in the upper face thereof for variantly returning the incident rays to said first-named reflector.

3. In a light projecting apparatus, a substantially parabolic reflector having a source of light in its focus, a transparent lens for the front of said reflector having a horizontal prism, and vertical cylindricity, and an inwardly faced reflecting surface formed on the outside of said lens in the upper face thereof for variantly returning the incident rays to said first-named reflector.

In testimony whereof I affix my signature in presence of two witnesses.

LOUIS BELL.

Witnesses:
VICTORIA LOWDEN,
MARION F. WEISS.